United States Patent [19]

Yazu et al.

[11] Patent Number: 4,610,699
[45] Date of Patent: Sep. 9, 1986

[54] HARD DIAMOND SINTERED BODY AND THE METHOD FOR PRODUCING THE SAME

[75] Inventors: Shuji Yazu; Tsutomu Nakamura, both of Itami, Japan

[73] Assignee: Sumitomo Electric Industries, Ltd., Osaka, Japan

[21] Appl. No.: 688,654

[22] Filed: Jan. 3, 1985

[30] Foreign Application Priority Data

| Jan. 18, 1984 [JP] | Japan | 59-7737 |
| Jul. 5, 1984 [JP] | Japan | 59-140119 |
| Jul. 5, 1984 [JP] | Japan | 59-140120 |
| Jul. 25, 1984 [JP] | Japan | 59-155940 |
| Oct. 25, 1984 [JP] | Japan | 59-224496 |

[51] Int. Cl.$^4$ .............................................. B24D 3/02
[52] U.S. Cl. .................................. 51/309; 51/293
[58] Field of Search ................................. 51/293, 309

[56] References Cited

U.S. PATENT DOCUMENTS

| 3,101,260 | 8/1963 | Cheney | 51/309 |
| 3,141,746 | 7/1964 | DeLai | 51/309 |
| 3,249,410 | 5/1966 | Lorenzo et al. | 51/309 |
| 3,574,580 | 4/1971 | Stromberg et al. | 51/309 |
| 3,913,280 | 10/1975 | Hall | 51/307 |

*Primary Examiner*—Paul Lieberman
*Assistant Examiner*—Willie J. Thompson
*Attorney, Agent, or Firm*—Wenderoth, Lind & Ponack

[57] ABSTRACT

The present invention relates to a hard diamond sintered body for use in tools such as cutting tools, excavating tools and wire drawing dies and a method for producing the same. A sintered body obtained by sintering fine powders of diamond under a superhigh pressure has been already used in cutting tools, drill bits, wire drawing dies and the like of nonferrous metals and similars. However, they have said that such a diamond sintered body is inferior in heat-resistance. The present invention was achieved from the investigation aiming at the elimination of the above described defect of being inferior in heat-resistance of the conventional diamond sintered body. That is to say, according to the present invention, synthetic diamond powders containing a diamond synthesizing catalyst consisting of VIII group ferrous metals of the periodic table or Cr, Mn or Ta or alloys containing them used in the synthesis of diamond at a ratio of 0.01 to 10% by weight are exposed to a high temperature under the condition wherein diamond is unstable to graphitize a part or whole thereof and then the resulting raw materials are filled in a reaction vessel consisting of at least one kind of metals selected from a group consisting of Ti, Zr, Hf, V, Nb, Ta, Cr, Mo, W and the like and sintered at a superhigh pressure of 50 Kb or more and high temperature of 1,400° C. or more, under which diamond is stable, to obtain a diamond sintered body. In short, the present invention relates to a hard diamond sintered body, characterized by comprising intermetallic compounds consisting of metals or alloys thereof contained in said diamond as a raw material and metals composing a reaction vessel at a ratio of 0.01 to 12% by weight, and a method for producing the same. A hard diamond sintered body obtained according to the present invention is superior in heat-resistance and abrasion-resistance, in particular heat-resistance, of which lowness has been a disadvantage of the conventional diamond sintered body, can be remarkably and successfully improved without reducing the strength.

4 Claims, 1 Drawing Figure

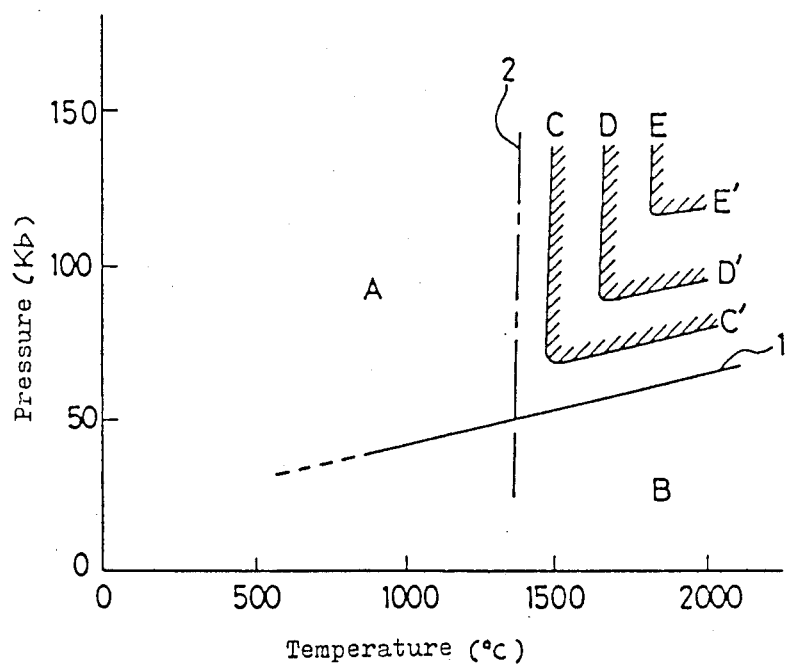

HARD DIAMOND SINTERED BODY AND THE METHOD FOR PRODUCING THE SAME

The present invention relates to a hard diamond sintered body for use in tools such as cutting tools, excavating tools and wire drawing dies and a method for producing the same.

PRIOR ARTS

A sintered body obtained by sintering fine diamond powders at a superhigh pressure has been already and widely used as cutting tools, drilling bits, wire drawing dies and the like of nonferrous metals and similars.

According to Japanese Patent Publication No. 52-12126 (1977) such a sintered body is obtained by sintering diamond powders, which are disposed so as to contact with a molded body or a sintered body of a WC-Co type carbide alloy, at the temperature, at which a liquid phase of carbide alloy is produced, or more under a superhigh pressure. At this time, a part of Co contained in a carbide alloy is raided into a layer of diamond powders to act as a bonding metal. A sintered body obtained according to this method comprises Co therein at a ratio of about 10 to 15% by volume.

PROBLEMS TO BE SOLVED BY THE PRESENT INVENTION

Since a sintered body containing Co at a ratio of about 10 to 15% by volume produced by the above described method is electrically conductive, it is comparatively easy to work by means of electric discharge machining, and therefore, it has a sufficiently practical performance as a cutting tool for nonferrous metals and the like.

However, on the other hand, this sintered body has a defect of being inferior in heat-resistance. For example, if this sintered body is heated to temperatures of 750° C. or above, the abrasion-resistance and strength thereof are reduced and it is destroyed at temperatures of 900° C. or above.

It seems to be a reason of the above described that diamond is graphitized on the grain boundary between diamond powders and Co, which is a bonding material, and a thermal stress is generated due to the difference in thermal expansion coefficient between diamond powders and Co.

Furthermore, it is known that the heat-resistance of a sintered body containing Co as a bonding material can be improved by treating it with acids to remove almost of the phase of bonding metal.

For example, Japanese Patent Application Laid-Open No. 53-114589 (1978) discloses a method for producing a diamond sintered ed body improved in heat-resistance. However, since voids are formed at the places, from which the phase of bonding metal was removed, the strength of a diamond sintered body is inevitably reduced.

In addition, since the reduction of electrical conductivity of a diamond sintered body is taken with the removal of Co, which is a bonding material, therefrom, this diamond sintered body shows a defect that an electric discharge machining can not be applied thereto.

On the other hand, although it has been tried also to sinter diamond powders alone under a superhigh pressure, since diamond powders are difficulty deformed, the pressure can not be transmitted to the gaps between powders and the graphitization thereof is taken place, whereby only a diamond-graphite composite is obtained.

MEASURES FOR SOLVING THE PROBLEMS

The present invention relates to a hard diamond sintered body improved in heat-resistance, of which lowness has been a defect of the conventional diamond sintered body, and a method for producing the same, in particular to a hard diamond sintered body improved in heat-resistance without reducing an electrical conductivity of the conventional diamond sintered body and a method for producing the same.

That is to say, it is an object of the present invention to provide a hard diamond sintered body obtained by exposing synthetic diamond powders comprising a diamond synthesizing catalyst, which is used in the synthesis of diamond and consists of VIII iron group metals or Cr, Mn and Ta or alloys containing them, at a ratio of 0.01 to 10% by weight to a high temperature under the condition, wherein diamond is unstable, to graphitize a part or whole thereof and then filling the resulting raw materials in a reaction vessel consisting of at least one kind of metals selected from a group consisting of Ti, Zr, Hf, V, Nb, Ta, Cr, Mo, W and the like followed by sintering them at a super-high pressure of 50 Kb or more and high temperature of 1,400° C. or more under which diamond is stable, characterized by comprising intermetallic compounds consisting of metals or alloys thereof contained in said raw materials and metals composing said reaction vessel at a ratio of 0.01 to 12% by weight, and a method for producing the same.

The drawings are graphs showing the relations between temperatures and pressures in the graphitizing process of raw materials and the sintering process of diamond powders in one embodiment of the present invention, in which 1 shows a graphite-diamond equilibrium line; 2 shows a catalyst metal-carbon eutectic line; A shows a region in which diamond is stable; B shows a region in which graphite is stable; C—C' shows a region of temperatures and pressures in which raw materials having a graphitized degree of 10% can be sintered; D—D' shows a region of temperatures and pressures in which raw materials having a graphitized degree of 40% can be sintered; and E—E' shows a region of temperatures and pressures in which raw materials having a graphitized degree of 70% can be sintered.

In the present invention, synthetic diamond powders including VIII iron group metals of the periodic table or Cr, Mn and Ta or alloys thereof used as a catalyst in the synthesis of diamond as impurities or boron-containing synthetic diamond powders including VIII iron group metals or Cr, Mn and Ta or alloys thereof used as a catalyst in the synthesis of diamond in crystals thereof as impurities are used for the powders of said raw materials.

In addition, synthetic diamond powders grow in dependence upon the growing condition thereof with taking a catalysis metal, which was used in the synthesis thereof, in the specified plane or orientation inside crystals.

The present inventors selected synthetic diamond powders containing the specified quantity of such inclusions and graphitized a part or whole of diamond by heating prior to sintering. The graphitized powders were filled in a reactive vessel made of at least one kind of metals selected from a group consisting of Ti, Zr, Hf, V, Nb, Ta, Cr, Mo, W and the like and sintered at a superhigh pressure and high temperature, under which diamond is stable, with preventing said metals or alloys thereof from raiding thereinto from the outside of system, e.g. with the use of iron group materials and Cr, Mn and Ta in the raw material.

As a result, it was found that where synthetic diamond powders including metallic impurities therein at a ratio of 0.01 to 10% by weight were used as the starting raw materials, graphitized diamond was converted to diamond again in the sintering process, whereby a compact sintered body was obtained.

In addition, it was found that where synthetic diamond powders including catalysis metal impurities at a ratio of 0.01 to 3.0% by weight and boron, which was added to form solid solutions, at a ratio of 0.001 to 1.0% by weight were used as the starting raw materials, the resulting diamond sintered body had an electrical conductivity almost equivalent to that of the conventional diamond sintered body including Co as a bonding material, being remarkably compact and strong, and being remarkably improved in heat-resistance in comparison with the conventional diamond sintered body.

For the comparison, catalysis metal powders were added to synthetic diamond powders, which contained impurities at a comparatively small ratio, for example at a ratio less than 0.01% by weight and in which a part or whole of diamond was graphitized by heating, and the resulting mixture was sintered. In this case, it was found that a sufficiently compact sintered body could not be obtained and graphite was remained. According to this method, the similar results were obtained even if natural diamond was used as raw materials.

It seems to be a reason of the above described that a small amount of catalysis metal can be very difficultly mixed with diamond powders uniformly and diamond powders can be firmly bonded to each other at the places where catalysis metals exist but graphite is remainded without being converted to diamond at the places where catalysis metals do not exist.

In addition, it can be inferred on the analogy of the above described that catalysis metals taken in diamond in the synthesis thereof acts in the sintering process differently from those added subsequently.

Furthermore, according to the above described method, since boron existed on the grain boundary of diamond without being diffused in the inside of diamond powders when synthetic diamond powders containing a diamond synthesizing catalyst at a ratio of 0.01 to 3.0% by weight and boron at a ratio of 0.001 to 1.0% by weight were used as raw materials, it was substantially impossible to apply an electric discharge machining to a sintered body consisting of larger diamond powders having diameters of 100 microns or more.

OPERATION

As described above, it was supposed that the sufficient improvement in heat-resistance would not be effected for a hard diamond sintered body according to the present invention, in particular when comprising catalysis metals therein. It was, however, found from the experimental results that a hard diamond sintered body according to the present invention could be remarkably improved in heat-resistance in comparison with the conventional diamond sintered body, being resistant even to heating at 1,000° C. It seems to be the first reason why heat-resistance is remarkably improved that the content of metals in a hard diamond sintered body according to the present invention is less than that in a sintered body obtained by the conventional method in which diamond powders are impregnated with Co and it seems to be the second reason why heat-resistance is remarkably improved that metals are different in distribution and characteristics thereof.

That is to say, it seems that catalysis metals, which were taken in diamond in the synthesis thereof, act in the sintering process differently from those added thereto subsequently.

It was observed that in a hard diamond sintered body according to the present invention, crystalline particles were very closely joined to each other and almost of catalysis metal existed in the inside of said crystalline particles rather than on the grain boundary of said crystalline particles in the form of spheroidal or plate-like sediment.

On the other hand, in the conventional sintered body, catalysis metals exist on the boundary surface of diamond particles in the form of thin film.

It is a reason of the above described that Co, which raids into the gap between diamond powders in the sintering process, acts as a bonding phase.

Also in a hard diamond sintered body according to the present invention, a small amount of thin film-like-metal exists on the grain boundary of diamond but it is an intermetallic compound formed by the action of at least one kind of metals used as materials composing a reaction vessel and selected from a group consisting of Ti, Zr, Hf, V, Nb, Ta, Cr, Mo, W and the like, which are diffused in raw materials in the sintering process, upon catalysis metals which are not contained in diamond particles but remained on the grain boundary of said diamond particles.

As a result, it seems that since almost of catalysis metals is dispersed in diamond particles in a sintered body according to the present invention, the graphitization is difficultly taken place by heating.

In addition, it can be inferred on the analogy of that a metallic phase existing on the grain boundary in a small amount is an intermetallic compound of metals composing a reaction vessel and catalysis metals contained in diamond used as a raw material and the difference thereof from diamond in thermal expansion coefficient is small in comparison that of metals or alloys thereof acting as a catalyst that a thermal stress, which is generated in a sintered body by heating, is reduced.

Thus, it seems that in a sintered body according to the present invention the contact surface area of a metallic phase and diamond is relatively small and the graphitization of grain boundary of crystals by heating is difficultly taken place, whereby heat-resistance is remarkably improved.

Thus, the present invention made the production of a diamond sintered body remarkably improved in heat-resistance possible.

In addition, since synthetic diamond containing boron added to form solid solutions is used as diamond, which is used as a raw material, at the same time, a sintered body does not lose an electrical conductivity thereof even if a small amount of metal is contained, as described above, whereby it has an advantage of capable of applying an electrical discharge machining thereto.

In the practice of the present invention, synthetic diamond containing catalysis metals or alloys containing them in crystals at a ratio of 0.01 to 10% by weight or synthetic diamond powders further containing boron added to form solid solutions at a ratio of 0.001 to 1.0% by weight are used for the starting material.

It is a reason why the content of catalysis metals or alloys containing them in synthetic diamond is limited to a range of 0.01 to 10% by weight that sintering is difficultly carried out at any combination of graphitized degree and sintering condition selected for the experiments in a range smaller than 0.01% by weight while the heat-resistance of a sintered body is undesirably reduced in a range larger than 10% by weight.

In addition, as to the content of boron contained in diamond used as a raw material, the addition of boron at a ratio smaller than 0.001% by weight is not desirable since an electrical conductivity of a sintered body becomes lower, whereby it becomes difficult to apply an electric discharge machining to a sintered body while also the addition of boron at a ratio larger than 1.0% by weight is not desirable since the abrasion-resistance of a sintered body is reduced.

The graphitization of the starting material is necessary for the improvement of sintering property and it is carried out by heating diamond powders at temperatures of 1,400° C. or higher in vacuum or a nonoxidizing atmosphere.

Then, the raw materials, a part or whole of which was graphitized, are filled in a reaction vessel made of at least one kind of metals selected from a group consisting of Ti, Zr, Hf, V, Nb, Ta, Cr, Mo, W and the like of a reaction vessel, which does not contain the above described metallic impurities and does not chemically act upon the raw materials, and sealed by means of an electric beam welding and the like in a high vacuum of $5 \times 10^{-4}$ Torr or more. The vacuocity under $5 \times 10^{-4}$ Torr is not desirable since the sintering property is deteriorated due to an influence by a gas absorbed onto the raw material.

Furthermore, sintering is preferably carried out in a superhigh pressure apparatus such as a belt type superhigh pressure apparatus at least at pressures of 50 Kb or more and temperatures of 1,400° C. or more, under which diamond is stable, preferably high temperatures of 70 Kb or more and high temperatures of 1,600° C. or more.

After the completion of the sintering process black lumps of diamond can be obtained by dissolving the recovered capsule in heated hydrochloric acid.

The resulting sintered body has a specific resistance of $10^3$ to 0.1 ohm.cm and is capable of being subjected to an electric discharge machining similarly as the conventional diamond sintered body containing Co as a bonding material.

The present invention will be described below in detail with reference to the following examples:

EXAMPLE 1

Synthetic diamond powders having a mean particle size of 25 microns and containing metallic impurities as shown in the following table 1 were used as the starting material:

TABLE 1

| Powder No. Contained metal | A | B | C | D |
|---|---|---|---|---|
| | | | | (Unit ppm) |
| Fe | 600 | 1,600 | 4,700 | 1,500 |
| Ni | 79,400 | 11,900 | 2,700 | — |
| Co | — | — | — | 2,300 |

TABLE 1-continued

| Powder No. Contained metal | A | B | C | D |
|---|---|---|---|---|
| | | | | (Unit ppm) |
| Cr | 4,300 | 500 | 100 | — |
| Mn | 300 | 100 | 700 | — |
| Ta | 200 | 500 | — | — |
| Total | 84,800 | 14,600 | 8,200 | 3,800 |

Numerical values in the above described Table 1 are the contents of metals contained in diamond powders analyzed by means of a mass spectrometer.

Each of the above described diamond powders is held in a vacuum furnace at 1,400° C. for 1 hour. The diamond powders are taken out of the vacuum furnace and then tested on partially graphitized percent by means of an X-ray diffraction method. The partially graphitized percent was about 90 wt %, 50 wt %, 30 wt % and 20 wt % for A, B, C and D, respectively.

These powders are filled in a vessel made of Ta and then the vessel is sealed hermetically. Subsequently, the vessel is held at a pressure of 50 Kb and a temperature of 1,400° C. for 5 minutes in a belt type superhigh pressure apparatus to sinter the powders.

As a result, a sintered body could be recovered excepting the case of the powder D. In the case of the powder D, a sufficient sintered body could not be obtained.

An X-ray diffraction of the resulting sintered body did not teach the existence of graphite remaining in the case of the powders A, B. However, merely a small amount of graphite was found to be remained in the case of the powder C.

Then a cutting tip is produced from a sintered body obtained from the powders A, B. The performance was evaluated by cutting an alumina sintered body having a Vickers hardness of 2,000.

The abrasion width of a flank of a tool is shown in Table 2 with a sintered body containing Co at a ratio of about 10% on the market as the reference material.

In this time, cutting was carried out under the following conditions:
Cutting speed: 50 m/min
Depth of cut: 0.5 mm
Feed: 0.05 mm/rpm
Cutting time: 15 minutes (dry cutting)

TABLE 2

| | Abrasion width of a flank (mm) |
|---|---|
| A | 0.35 |
| B | 0.20 |
| Reference material | 0.50 |

EXAMPLE 2

Experiments were carried out under various kinds of sintering condition as shown in Table 3 using the powder A used in the Example 1.

TABLE 3

| No. | Pressure (Kb) | Temperature (°C.) | Sintered state |
|---|---|---|---|
| 1 | 45 | 1350 | Graphite remained |
| 2 | 55 | 1450 | Good |
| 3 | 60 | 1700 | " |

TABLE 3-continued

| No. | Pressure (Kb) | Temperature (°C.) | Sintered state |
|---|---|---|---|
| 4 | 70 | 1900 | " |
| 5 | 55 | 1800 | Graphite remained |

It is thought from Table 3 that the remaining of graphite in the experiments No. 1 is due to insufficient pressure as well as temperature and the remaining of graphite in the experiment No. 5 is due to too high temperature which is out of a range wherein diamond is stable.

Subsequently, the heating tests were carried out on sintered bodies of No. 2 to No. 4. Every sintered body did not show any change in external appearance and specific gravity even after heating at 1,000° C. for 30 minutes.

EXAMPLE 3

Various kinds of diamond powder having a mean particle size of 30 microns and containing metallic impurities as shown in the following table 4 were used as raw materials:

TABLE 4

| Powder Contained metal | E | F | G | H |
|---|---|---|---|---|
| | | | | (Unit ppm) |
| Fe | 4,500 | 800 | 400 | — |
| Co | — | 3,500 | 300 | 40 |
| Ni | 7,300 | 400 | 800 | 30 |
| Cr | 20 | 50 | 100 | — |
| Mn | 30 | — | — | — |
| Ta | — | 10 | — | 10 |
| Total | 11,850 | 4,760 | 1,600 | 80 |

Numerical values in the above described Table 4 are the contents of metals contained in diamond powders analyzed by means of a mass spectrometer.

Each of the above described powders was treated in vacuum at 1,500° C. for 1 hour. The diamond powders were taken out and then tested on graphitized percent by means of an X-ray diffraction method. The partially graphitized percent was about 90 wt %, 50 wt %, 8 wt % and 0.3 wt % for E, F, G and H, respectively.

These powders were filled in a reaction vessel made of Ti and then the reaction vessel was sealed hermetically under a high vacuum of $5 \times 10^{-6}$ Torr.

For the comparison, also natural diamond without containing metals as shown in Table 4 was filled in the reaction vessel alike. These samples were sintered by holding in a belt type high pressure apparatus at a pressure of 70 Kb and a temperature of 1,800° C. for 10 minutes.

As a result, in the cases of the powder H and natural diamond, the sintering property was bad and the resulting sintered body was cracked.

An X-ray diffraction of the resulting sintered body taught that graphite did not remain in the cases of powders E, F and G but a small amount of graphite remained in the cases of powder H and natural diamond.

Inside the sintered bodies of E, F and G, were formed intermetallic compounds consisting of VIII iron group and vessel made of Ti.

Then, a cutting tip was produced from a sintered body obtained from the powders E, F and G. Their performance was evaluated by cutting an alumina sintered body having a Vickers hardness of 2,000.

The abrasion width of a flank of a tool is shown in Table 5 with a sintered body containing Co at a ratio of about 10% on the market as the reference material.

The cutting test was carried out under the same conditions as in Example 1.

TABLE 5

| Sintered body | Abrasion width of a flank (mm) |
|---|---|
| Sintered body using the powder E therein | 0.16 |
| Sintered body using the powder F therein | 0.12 |
| Sintered body using the powder G therein | 0.10 |
| Reference material | 0.53 |

EXAMPLE 4

The powder G shown in Table 4 was filled in a reaction vessel made of V and sintered by holding under the conditions as shown in Table 6 for 5 minutes. Also the characteristics of the resulting sintered bodies are shown in Table 6.

TABLE 6

| No. | Pressure (Kb) | Temperature (°C.) | Sintered state | Vickers hardness (kg/mm²) |
|---|---|---|---|---|
| 1 | 43 | 1300 | Graphite remained | 6000 |
| 2 | 75 | 1900 | Good | 12000 |
| 3 | 65 | 1700 | " | 11500 |
| 4 | 53 | 1800 | Graphite remained | 7500 |
| 5 | 90 | 2000 | Good | 13000 |
| 6 | 67 | 1650 | " | 11800 |

It is thought from the results as shown in the above described Table 6 that the remaining of graphite in the experiment No. 1 is due to insufficient pressure as well as temperature and the remaining of graphite in the experiment No. 4 is due to too high temperature which is out of a range wherein diamond is stable.

Then, the heating tests were carried out on sintered bodies of Nos. 2, 3, 5 and 6 which did not show the existence of graphite remaining and showed a good sintered state. Every sintered body did not show any change in external appearance, hardness and specific gravity even after heating at 1,000° C. for 30 minutes.

EXAMPLE 5

Various kinds of diamond powder having a mean particle size of 30 microns and containing metallic impurities as shown in the following Table 7 were used as the raw materials:

TABLE 7

| | | Powder | | | | (Unit: weight %) |
|---|---|---|---|---|---|---|
| Contained metal | | I | J | K | L | M |
| Catalysis metal | Fe | 0.3 | 0.2 | 0.4 | 0.5 | 0.001 |
| | Co | 2.0 | 1.0 | 0.3 | 0.2 | 0.003 |
| | Ni | 1.3 | 0.2 | — | 0.1 | 0.001 |
| | Cr | 0.1 | 0.3 | 0.2 | 0.3 | — |
| | Mn | 0.2 | — | 0.2 | — | — |
| | Ta | — | 0.1 | — | 0.2 | — |
| | B | 0.01 | 0.8 | 0.02 | — | — |
| Total of | | 3.9 | 1.8 | 1.1 | 1.3 | 0.005 |

TABLE 7-continued (Unit: weight %)

| Contained metal | Powder | | | | |
|---|---|---|---|---|---|
| | I | J | K | L | M |
| catalysis metals | | | | | |

Numerical values in the above described Table 7 are the contents of metals contained in diamond powders analyzed by means of a mass spectrometer.

Each of the above described powders was held at 1,450° C. for 1 hour in a vacuum furnace. The powders were taken out of the vacuum furnace and then tested on partially graphitized percent by means of an X-ray diffraction method. The partially graphitized percent was about 90 wt %, 50 wt %, 30 wt %, 35 wt % and 2 wt % for I, J, K, L and M, respectively.

These powders were filled in a reaction vessel made of Nb and then the reaction vessel was sealed hermetically under a high vacuum of $5 \times 10^{-6}$ Torr. For the comparison, also natural diamond without containing metals as shown in Table 7 was filled in the reaction vessel without graphitizing alike. These samples were sintered by holding at a pressure of 70 Kb and a temperature of 1,800° C. in a belt type high pressure apparatus.

As a result, sintered bodies resulting from the powder M and natural diamond showed a bad sintering property and were cracked. An X-ray diffraction of the resulting sintered body taught that graphite did not remain in the cases of powders I, J, K and L but a small amount of graphite remained in the cases of the powder M and natural diamond.

Sintered bodies obtained from the powders I, J, K and L have specific resistance as shown in Table 8. Accordingly, the application of an electric discharge machining was possible in all cases other than that of the powder L.

TABLE 8

| Sintered body | Specific resistance (ohm · cm) |
|---|---|
| I | $1.1 \times 10^2$ |
| J | 0.15 |
| K | 1.0 |
| L | $8 \times 10^5$ |

A cutting tip was produced from sintered bodies I, J and K by means of an electric discharge machining and its performance was evaluated by cutting an alumina sintered body having a Vickers hardness of 2,000.

An abrasion width of a flank of a tool in the cutting tests is shown in Table 9 with showing a sintered body containing Co at a ratio of about 10% on the market as a reference material.

TABLE 9

| Sintered body | Abrasion width of a flank (mm) |
|---|---|
| I | 0.28 |
| J | 0.25 |
| K | 0.12 |
| Reference material | 0.53 |

The sintered body I is inferior in heat-resistance due to the higher content of catalysis metals and the sintered body J is inferior in abrasion-resistance due to the larger content of boron. The sintered body K is remarkably improved in heat-resistance and abrasion-resistance without reducing an electrical conductivity due to an optimum content of impurities in the raw material.

EXAMPLE 6

Synthetic diamond powders having a mean particle size of 25 microns and containing metallic impurities as shown in the following Table 10 was used as the starting raw material.

TABLE 10

| Contained metal | Fe | Ni | Co | Cr | Mn | Ta | Total |
|---|---|---|---|---|---|---|---|
| Content (ppm) | 20 | 150 | 120 | 10 | 5 | 5 | 310 |

These powders were used as raw materials for producing sintered bodies after graphitizing a part thereof under various kinds of condition.

The graphitizing conditions of raw materials as well as the graphitized percent evaluated by means of an X-ray diffraction method are shown in Table 11.

TABLE 11

| Item Powder No. | Graphitizing condition | | | Partially graphitized percent (%) |
|---|---|---|---|---|
| | Atmosphere | Temperature (°C.) | Time (min) | |
| a | Vacuum | 1500 | 30 | 12 |
| b | Vacuum | 1250 | 60 | 0 |
| c | Argon | 1800 | 40 | 70 |
| d | Vacuum | 1600 | 90 | 40 |
| e | Nitrogen | 1700 | 10 | 40 |

Subsequently, the graphitized raw materials were sintered at various pressures and temperatures.

As a result, it was made clear that the graphitized raw materials could be sintered under the conditions defined by V-letter ranges as shown by C—C', D—D' and E—E' in the attached figure in accordance with graphitized percentage.

All of the resulting sintered bodies are strong and have a Vickers hardness of 13,000 kg/mm$^2$, and they did not show any change in shape even after heating at 1,100° C. in vacuum.

Synthetic diamond powders having a mean particle size of 50 microns and containing metallic impurities as shown in the following table 12 were used as the starting raw materials.

TABLE 12

| | | | | | | | (Unit: ppm) |
|---|---|---|---|---|---|---|---|
| Contained metal Powder No. | Fe | Ni | Co | Cr | Mn | Ta | Total |
| f | 300 | 50 | 200 | 0 | 10 | 20 | 580 |
| g | 200 | 1200 | 800 | 40 | 100 | 20 | 2360 |
| h | 100 | 40 | 20 | 20 | 5 | 5 | 190 |
| i | 20 | 10 | 20 | 0 | 5 | 0 | 55 |

Numerical values in the above described table 12 are the contents of metals in diamond powders analyzed by means of a mass spectrometer.

Each of the above described powders was held at 1,500° C. for 30 minutes in a vacuum furnace. The powders were taken out of the vacuum furnace and then tested on partially graphitized percent by means of an X-ray diffraction method. The partially graphitized percent was about 15 wt %, 25 wt %, 10 wt % and 5 wt % for the powder f, g, h and i, respectively.

These resulting powders were filled in a vessel made of Ta and then sintered by holding at a pressure of 85 Kb and a temperature of 1,700° C. for 5 minutes in a belt type superhigh pressure apparatus.

As a result, sintered bodies could be recovered in the cases other than that of the powder i. In the case of the powder i, a satisfactory sintered body could not be obtained.

An X-ray diffraction of the resulting sintered bodies taught that graphite did not remain in the cases of the powders f, g and h but a small amount of graphite remained in the case of the powder i.

Subsequently, a cutting tip was produced from the resulting sintered bodies obtained from the powders f, g and h and then its performance was evaluated by cutting an alumina sintered body having a Vickers hardness of 2,000.

An abrasion width of a flank of a tool is shown in Table 13 with showing a sintered body containing Co at a ratio of about 10% on the market as a reference material. The cutting tests were carried out under the same cutting conditions as in Example 1.

TABLE 13

| Sintered body | Abrasion width of a flank (mm) |
| --- | --- |
| f | 0.09 |
| g | 0.13 |
| h | 0.08 |
| Reference material | 0.52 |

EFFECTS

A hard diamond sintered body produced according to a method of the present invention has superior heat-resistance and abrasion-resistance required for the materials of tools such as cutting tools, excavating tools, wire drawing dies and dressers. In particular, the heat-resistance, of which lowness has been a defect of the conventional diamond sintered body, is remarkably improved without reducing the strength with having an electrical conductivity equivalent to that of a sintered body containing Co as a bonding material. Accordingly, its range of using as the material for tools can be remarkably expanded and the performance of tools can be remarkably improved.

What is claimed is:

1. A hard diamond sintered body, wherein diamond particles are mutually bonded, obtained by graphitizing a part or whole of a synthetic diamond powder comprising Group VIII iron group metals of the Periodic Table or metals selected from Cr, Mn and Ta present in an amount of 0.01 to 10% by weight and then sintering the powder under such conditions that the diamond is stable, said sintered body containing intermetallic compounds consisting of at least one material selected from said iron group metals of Cr, Mn and Ta or alloys thereof and/or said metals or alloys and at least one metal selected from Ti, Zr, Hf, V, Nb, Mo, W, Cr and Ta as the remainder in an amount of 0.01 to 12% by weight.

2. A conductive hard diamond sintered body, wherein diamond particles are mutually bonded, characterized by graphitizing a part or whole of synthetic diamond powders comprising a diamond synthesizing catalyst, which is used in the synthesis of diamond and consists of Group VIII iron group metals of the Periodic Table or Cr, Mn, Ta or alloys containing them in an amount of 0.01 to 3.0% by weight and boron in an amount of 0.001 to 1.0% by weight and then sintering at a super high pressure and high temperature, under which the diamond powder is stable, and comprising intermetallic compounds consisting of at least one material selected from iron group metals or Cr, Mn, Ta and B or alloys thereof and/or said metals or alloys and at least one metal selected from Ti, Zr, Hf, V, Nb, Mo, W, Cr, Ta as the remainder in a proportion of 0.01 to 12% by weight with the specific resistance of the diamond sintered body being $10^3$ to 0.1 ohm.cm.

3. A method for producing a hard sintered body, characterized in that synthetic diamond powder comprises preparing a compound consisting essentially of a diamond synthesizing catalyst, which is used in the synthesis of diamond and consists of Group VIII iron group metals of the Period Table or Cr, Mn and Ta or alloys containing them, in an amount of 0.01 to 10% by weight, or synthetic diamond powders comprising a diamond synthesizing catalyst which consists of iron group metals or Cr, Mn and Ta or alloys containing them in a proportion of 0.01 to 3.0% by weight and comprising boron in a proportion of 0.001 to 1.0% by weight, exposing said composition to a high temperature under such conditions, that the diamond is unstable, to graphitize a part or whole thereof, and then sintering the resulting raw materials at a super high pressure of 50 kb or more and a high temperature of 1,400° C. or more while preventing any excessive catalyst metal from outside of the system from entering into the reaction system.

4. A method for producing a hard diamond sintered body characterized in preparing a composition consisting essentially of a synthetic diamond powder comprising a diamond synthesizing catalyst, which is used in the synthesis of a diamond and consists of Group VIII iron group metals of the Periodic Table or Cr, Mn and Ta or alloys containing them, in a proportion of 0.01 to 10% by weight, or synthetic diamond powders comprising a diamond synthesizing catalyst, which consists of iron group metals or Cr, Mn and Ta or alloys containing them in a proportion of 0.01 to 3.0% by weight, and comprising boron in a proportion of 0.001 to 1.0% by weight, exposing said composition to high temperature under such conditions that the diamond is unstable, to graphitize a part or whole thereof and then adding the resulting raw materials to a reaction vessel consisting of at least one metal selected from the group consisting of Ti, Zr, Hf, V, Nb, Ta, Cr, Mo, and W and sintering the composition at a super high pressure of 50 kb or more and at a high temperature of 1,400° C. or more, under such conditions that the diamond is stable, diffusing metals from said reaction vessel into said raw materials to form intermetallic compounds between said metals diffusing from said reaction vessel into said raw materials and catalyst metals or alloys thereof left on the grain boundary of the diamond powder, said intermetallic compounds being present in the sintered body in an amount of 0.01 to 12% by weight.

* * * * *